(12) United States Patent
Giering

(10) Patent No.: US 9,145,939 B2
(45) Date of Patent: Sep. 29, 2015

(54) SUB-ASSEMBLY FOR AN ELECTROMECHANICAL BRAKE ACTUATOR

(75) Inventor: Wilfried Giering, Ridgeway (CA)

(73) Assignee: Lucas Automotive GmbH, Koblenz (DE)

( * ) Notice: Subject to any disclaimer, the term of this patent is extended or adjusted under 35 U.S.C. 154(b) by 232 days.

(21) Appl. No.: 13/518,531

(22) PCT Filed: Jul. 23, 2010

(86) PCT No.: PCT/EP2010/004544
§ 371 (c)(1),
(2), (4) Date: Aug. 24, 2012

(87) PCT Pub. No.: WO2011/076299
PCT Pub. Date: Jun. 30, 2011

(65) Prior Publication Data
US 2012/0325601 A1    Dec. 27, 2012

(30) Foreign Application Priority Data
Dec. 23, 2009 (DE) .......... 10 2009 060 201

(51) Int. Cl.
| | | |
|---|---|---|
| *F16D 21/08* | (2006.01) | |
| *F16H 1/46* | (2006.01) | |
| *F16D 65/18* | (2006.01) | |
| *F16D 65/00* | (2006.01) | |
| F16D 121/26 | (2012.01) | |
| F16D 121/24 | (2012.01) | |
| F16D 125/48 | (2012.01) | |
| F16D 125/50 | (2012.01) | |

(52) U.S. Cl.
CPC ............ *F16D 65/18* (2013.01); *F16D 65/0006* (2013.01); *F16D 2121/24* (2013.01); *F16D 2121/26* (2013.01); *F16D 2125/48* (2013.01); *F16D 2125/50* (2013.01); *F16H 1/46* (2013.01)

(58) Field of Classification Search
CPC .... F16H 1/46; F16D 2121/24; F16D 2121/26
USPC ................. 475/149, 154, 156, 152
See application file for complete search history.

(56) References Cited

U.S. PATENT DOCUMENTS

| | | | | |
|---|---|---|---|---|
| 5,588,821 | A * | 12/1996 | Kinoshita ..................... | 418/259 |
| 6,412,610 | B1 * | 7/2002 | Drennen et al. ............. | 188/156 |
| 8,051,957 | B2 | 11/2011 | Giering et al. | |
| 8,105,200 | B2 * | 1/2012 | Dettenberger et al. ....... | 475/323 |
| 8,186,488 | B2 | 5/2012 | Poertzgen | |
| 2004/0178028 | A1 | 9/2004 | Farmer et al. | |
| 2006/0000679 | A1 | 1/2006 | Hanna et al. | |
| 2008/0283345 | A1 | 11/2008 | Balz et al. | |
| 2009/0260929 | A1 * | 10/2009 | Boyle et al. .................. | 188/156 |
| 2009/0308698 | A1 | 12/2009 | Park | |
| 2010/0082213 | A1 * | 4/2010 | Taylor et al. ................... | 701/76 |
| 2012/0111673 | A1 | 5/2012 | Giering et al. | |

FOREIGN PATENT DOCUMENTS

| | | |
|---|---|---|
| DE | 102004043845 A1 | 3/2006 |
| DE | 102004048700 A1 | 5/2006 |
| DE | 102006037660 A1 | 7/2007 |
| DE | 102006007755 A1 | 8/2007 |
| DE | 102007046953 A1 | 4/2009 |
| DE | 202008002796 U1 | 7/2009 |
| DE | 102008002251 A1 | 12/2009 |
| EP | 1767806 A2 | 3/2007 |
| WO | 2004044445 A2 | 5/2004 |
| WO | 2007096098 A1 | 8/2007 |
| WO | 2002075759 A2 | 9/2009 |

* cited by examiner

*Primary Examiner* — Tisha Lewis
(74) *Attorney, Agent, or Firm* — MacMillan, Sobanski & Todd, LLC (57) ABSTRACT

The invention relates to a subassembly for a brake actuator which is provided for an electromechanically operated parking brake. The subassembly comprises a drive device and gear device for generating and transmitting a torque to a brake device and a fixing element which secures the arrangement of the gear device relative to the drive device, an internal-toothed wheel of the gear device being integrated in the fixing element.

28 Claims, 6 Drawing Sheets

SUB-ASSEMBLY FOR AN ELECTROMECHANICAL BRAKE ACTUATOR

CROSS-REFERENCE TO RELATED APPLICATIONS

This application is a national stage of International Application No. PCT/EP2010/004544 filed Jul. 23, 2010, the disclosures of which are incorporated herein by reference in entirety, and which claimed priority to German Patent Application No. DE 10 2009 060 201.1 filed Dec. 23, 2009, the disclosures of which are incorporated herein by reference in entirety.

BACKGROUND OF THE INVENTION

The present invention relates to the field of motor vehicle brakes. More precisely, the invention relates to an improved construction of a subassembly of a brake actuator which is provided for an electromechanically operated parking brake or an electromechanically operated service brake.

Electrically operated parking brakes are used increasingly often in motor vehicles. They have the advantage that they can be controlled with modern on-board electronic systems, thereby opening up new possibilities for the use of parking brakes in a motor vehicle. For example, by electronically controlling such a parking brake, it is possible to prevent undesirable backward rolling when starting on an incline or quite generally the opening of the parking brake can be made dependent on an appropriate operating point of the vehicle motor.

An electrically operated parking brake generally comprises an electromechanical brake actuator, which applies a closing clamping force to a wheel brake by means of a spindle gear and an axially displaceable brake piston. In this case the brake actuator is substantially defined by a subassembly which comprises motor and gear units and which is arranged in a damping manner in a housing. A particular challenge involves providing a powerful brake actuator which supplies the necessary closing clamping force to the wheel brake and is simultaneously constructed in a compact manner in order to save space and weight. Therefore, there is often used a multiple-stage planet gear which is distinguished by a compact construction and a high reduction of the rotational movement produced by the electric motor.

From patent application WO 2004/044445 A2 an electromechanical brake actuator is known which has an electric motor and a gear unit for generating and transmitting a torque. In this instance, a two-stage planet gear is used. The electric motor and components of the gear unit are orientated relative to each other on an auxiliary frame and are received in a damping manner in a housing. An internal-toothed wheel acting as a central component of the planet gear is arranged in a damping manner at a plurality of locations on the housing and on the auxiliary frame.

The stable mechanical fixing of the gear components of an electromechanical brake actuator is decisive in order, on the one hand, to reduce the volume and the weight of the brake actuator and, on the other hand, to increase its service-life. For example, already an external damage to the housing may result in the operational failure of the gear unit if it is supported directly on the housing.

BRIEF SUMMARY OF THE INVENTION

A feature of the present invention is to provide an improved construction for an electromechanical brake actuator.

To this end, there is provided a subassembly for an electromechanical brake actuator which provides for a drive device having an electric motor for generating a torque, and a gear device for transmitting and delivering the torque generated to a brake device. The subassembly further has a fixing element which fixes the position of the gear device relative to the drive device, an internal-toothed wheel of the gear device being constructed on the fixing element.

According to a first realization, components of the gear device can be arranged and secured to each other on the fixing element and can subsequently be introduced together with the drive device into a housing. According to a further realization, the fixing element may be constructed as a carrier element which connects both the drive device and the gear device to each other. In this instance, the drive device and the gear device may be connected by means of the carrier element in order to form a unit which can be handled separately and which is subsequently introduced into the housing. Furthermore, the drive device and the gear device can be arranged without contact relative to the housing, whereby the housing substantially still has only a protective function and not a centering or fixing function. However, a realization which is not contact-free is also possible.

The drive device may be arranged (optionally loosely) at a first end of the fixing element whilst the internal-toothed wheel is constructed at a second end of the fixing element. In this manner, the spacing between the drive-side and output-side components of the subassembly is fixed by means of the fixing element.

The fixing element may have a plate-like base member, in which an opening for receiving the drive device is provided at the first end. The plate-like base member can be provided with the internal-toothed wheel at the second end. The fixing element and the internal-toothed wheel may be constructed in two parts or integrally. Owing to the internal-toothed wheel being integrated into the fixing element in one piece, the number of individual parts of the subassembly is reduced, which has an advantageous effect on the weight, the compact structure, the production costs and the operational reliability of the subassembly.

According to one realization, the fixing element is constructed with an integrated internal-toothed wheel as a cast component. Cast components have the advantage that they can be mechanically loaded and can be produced in a cost-effective manner with narrow tolerances in terms of errors. Since the internal-toothed wheel is subjected to high mechanical loads (for example, vibrations), the securing of the internal-toothed wheel to the fixing plate or the housing assumes great significance. In particular, screwed securing arrangements may become loose over time and consequently reduce the service-life of the brake actuator.

The internal-toothed wheel may be part of a wobble plate mechanism, in which, for example, a wobble plate can be introduced. The internal-toothed wheel may also be part of a planet gear, in which additional components of the planet gear can be introduced. The internal-toothed wheel may comprise at least one internally toothed toothed wheel ring, in which at least one torque-transmitting planet wheel carrier of the gear device having a plurality of planet wheels thereon can be introduced. A multiple-stage construction of the planet gear may be advantageous in order to obtain a high power reduction without having to use an electric motor which has a more powerful torque (and is therefore heavier).

The one-stage or multiple-stage planet wheel carrier introduced into the internal-toothed wheel of the fixing plate may be secured against falling out by means of a retention element. The retention element may be constructed as a simple ring which can be secured in a close-fitting manner to the lower side of the internal-toothed wheel by means of a fixing device. According to this realization, all the essential components of the planet gear may be secured to the fixing element so that additional fixing by the housing is unnecessary.

The toothed wheel arrangement or the belt arrangement may be supported by means of a centering element. To this end, the centering element itself (for example, by means of plug type connectors) may be secured to the upper side of the fixing element in such a manner that the centering element and the fixing element delimit at the upper side and lower side a defined space in which the toothed wheels of the toothed wheel arrangement are introduced via toothed wheel shafts, respectively. The toothed wheel shafts may be supported on the centering element. This applies similarly in the case of a belt gear.

According to another aspect, a subassembly for an electromechanical brake actuator is provided and comprises a drive device having an electric motor for generating a torque and a gear device for transmitting the torque to a brake device. The gear device successively comprises a first, second and third gear stage, the third gear stage being constructed as a planet gear and an output-side gear element of the second gear stage and a sun wheel of the planet gear being fitted to a planet wheel carrier of the third gear stage via a first gear shaft, which sun wheel is arranged in a torque-locking and concentric manner with respect to the gear element.

The first gear shaft may be received at the first end thereof on a centering element and/or at the second end thereof on the planet wheel carrier. The first gear shaft may further be connected at the second end thereof to the planet wheel carrier of the third gear stage in a rotationally secure manner. The first gear shaft and the planet wheel carrier of the third gear stage may be constructed in one piece or two pieces. A one-piece construction is advantageous because the number of gear components is reduced. In one realization, the planet wheel carrier may be constructed with the first gear shaft as a cast component. In a further realization, the first gear shaft may be rotatably supported at the second end on the fixing element.

The planet wheel carrier of the third gear stage may be constructed in a disc-like manner. The first gear shaft received with the second end on the planet wheel carrier may be arranged at the centre of the planet wheel carrier. It may extend at one side into the space along the axis of rotation of the planet wheel carrier. Alternatively, the first gear shaft may extend into the space at both sides of the planet wheel carrier.

The disc-like planet wheel carrier may further be provided at one side with pin-like bearing shafts in order to receive planet wheels. These pin-like bearing shafts may be arranged on the planet wheel carrier around the first gear shaft which is arranged centrally at the same side. The pin-like bearing shafts may be connected in a rotationally secure manner to the planet wheel carrier.

The disc-like planet wheel carrier of the third gear stage may further be connected in a rotationally secure manner to an output element at the side directed away from the pin-like bearing shafts. The output element may be constructed in the form of a journal. It may be arranged centrally on the planet wheel carrier. The output element, the planet wheel carrier and the first gear shaft may be constructed integrally.

The planet wheels are preferably supported rotatably on the planet wheel carrier via the pin-like bearing shafts and the sun wheel via the centrally fitted first gear shaft. That common support of the sun wheel and planet wheels promotes close-fitting engagement of the gear wheels with each other so that the degree of efficiency and the wear properties of the planet gear are improved. Another advantage of a first gear shaft supported directly on the planet wheel carrier is that, for example, additional gear components of the gear device can be arranged on the planet wheel carrier via the first gear shaft. An operable subassembly of the gear device can thereby be constructed at the output side along the first gear shaft, whose gear components rest directly or indirectly on the planet wheel carrier.

Owing to the concentric support of the first gear shaft on the planet wheel carrier, the spatial position of the first gear shaft is determined by the guiding of the planet wheels supported on the planet wheel carrier in an internal-toothed wheel. In other words, the gear shaft is self-centred with respect to the internal-toothed wheel via the planet wheels which are engaged with the internal-toothed wheel.

In one realization, the internal-toothed wheel is integrally constructed with the fixing element. In this instance, the first gear shaft which centres itself by means of the internal-toothed wheel may be used as a reference for positioning and supporting additional gear components or the drive device on the fixing element in accordance with tolerances. In particular, production tolerances thereby become less significant in the construction of the internal-toothed wheel in the fixing element or carrier element.

According to a first realization, the second gear stage of the gear device may be constructed as a planet gear and the output-side gear element of the second gear stage as a planet wheel carrier. The two planet gears may be arranged in a rotatable manner successively along the first gear shaft. The first gear shaft may further receive in a supporting manner a sun wheel of the second gear stage and an output-side gear element of the first gear stage connected to the sun wheel in a torque-locking manner. An output-side subassembly of the gear device can thereby be produced and is distinguished by a compact construction and a high level of torque reduction.

According to an alternative realization, the second gear stage may be constructed as a toothed wheel mechanism or belt mechanism. In this instance, the output-side toothed wheel of the second gear stage is connected in a rotationally secure manner to the sun wheel of the third gear stage. A drive-side toothed wheel of the second gear stage may be supported at both sides on the fixing and centering element via a second gear shaft.

The transmission of the torque between the electric motor at the drive side and the second gear stage may be carried out by a toothed wheel arrangement which comprises a plurality of toothed wheels which are successively in positive-locking contact. The toothed wheel arrangement is connected, for example, at one end to a drive shaft of the electric motor and, at the other end, to a drive-side toothed wheel of the second gear stage so as to transmit torque. According to another realization, the torque may be transmitted by a V-belt which is tensioned between a first belt wheel, which is secured to the drive shaft in a non-positive-locking manner, and a second belt wheel, which is secured to the drive-side toothed wheel of the second gear stage in a non-positive-locking manner.

The fixing element and centering element may be constructed so as to complement each other so that the fixing element and centering element in the assembled state delimit a cage-like space for receiving gear components. The second gear shaft may be supported at its first end on the centering element and at its second end on the fixing element. The first gear shaft is supported at its first end on the centering element and at its second end on the planet wheel carrier.

Other advantages of this invention will become apparent to those skilled in the art from the following detailed description of the preferred embodiments, when read in light of the accompanying drawings.

DETAILED DESCRIPTION OF THE INVENTION

An embodiment of an assembly of an electromechanical brake actuator for an electrically operated parking brake is explained below. Corresponding elements in the Figures are given the same reference numerals. Terms such as "at the upper side" and "at the lower side" refer to the orientation of the assembly illustrated in the Figures. Of course, the electromechanical brake actuator may be orientated as desired (for example laid laterally) during installation.

Figure 1:
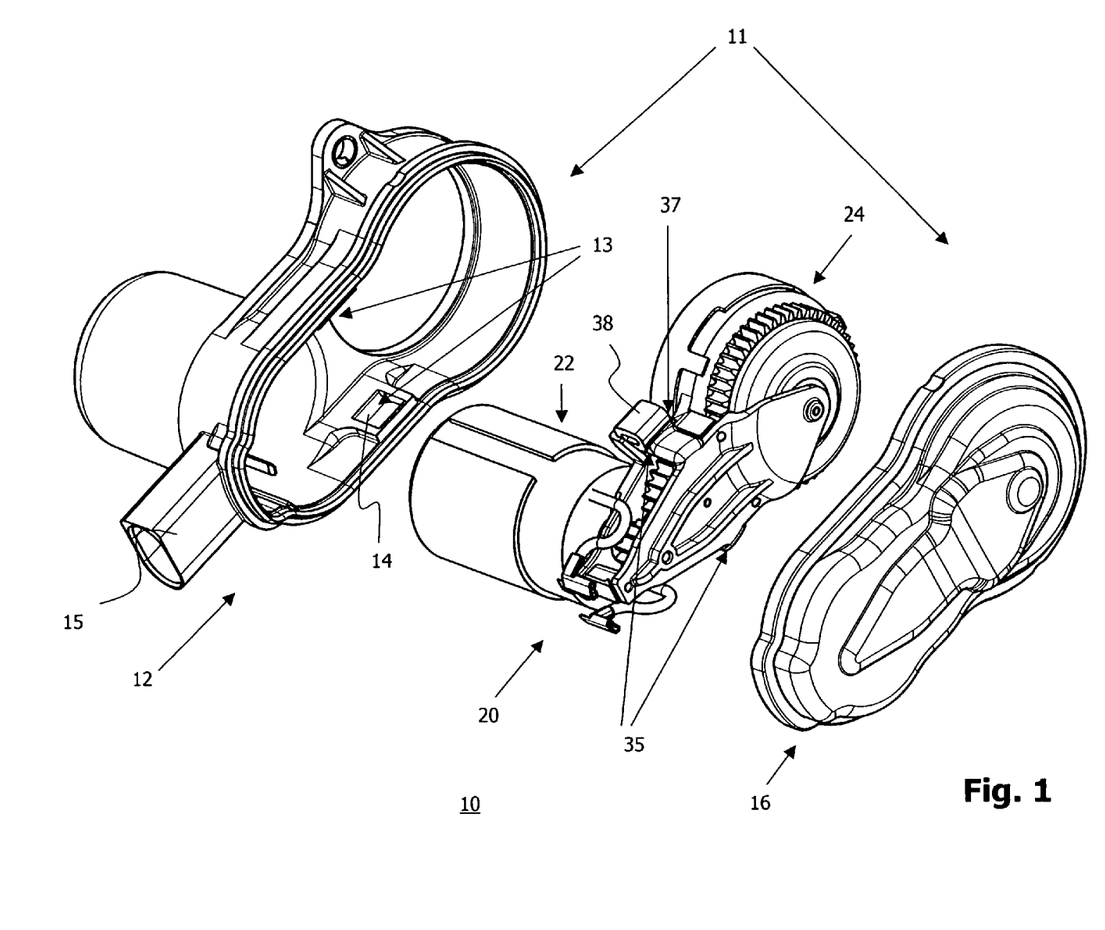
FIG. 1 is an exploded view of an embodiment of an assembly of an electromechanical brake actuator.

FIG. 1 is a perspective view of essential components of an assembly 10 of an electromechanical brake actuator. The assembly 10 comprises a housing 11 having a housing lower portion 12 and a housing upper portion 16 and a subassembly 20, which substantially comprises a drive device 22 and a gear device 24. Furthermore, the subassembly 20 has a first mounting device 35 which comprises two carriers 37 (only one carrier can be seen in FIG. 1 owing to the perspective view) which are each provided with a damping element 38 and which are each arranged laterally in the subassembly 20.

The housing lower portion 12 serves to receive the subassembly 20 and is therefore adapted to the dimensions of the subassembly 20 in terms of its spatial configuration. The housing lower portion 12 has a second mounting device 13 which comprises two recesses 14 at the longitudinal sides of the housing lower portion 12. Furthermore, the housing lower portion 12 has a cylindrical hollow space which is constructed so as to be open at one side for receiving the drive device 22 in a close-fitting manner. An electrical plug type connector 15 having contact pins is formed above the cylindrical hollow space at a transverse side of the housing lower portion 12 in order to supply electrical power to the drive device 22 and control it.

The drive device 22 provided for generating a torque and the gear device 24 provided for transmitting the torque are mounted outside the housing 11 and then inserted as an independently operable unit into the housing lower portion 12. In this instance, in the present configuration, the subassembly 20 is laterally clamped in the corresponding recesses 14 on the housing lower side 12 via the laterally protruding damping elements 38 which are fitted to the respective opposing carriers 36. The subassembly 20 is consequently coupled to the housing 11 in a damping manner at only two support locations. In this manner, vibrations which are necessarily produced in the operating state of the drive and gear device 22, 24 are shielded from the housing 11 in a particularly effective manner. A detailed description of the suspension of the subassembly 20 in the housing lower portion 12 follows further below with reference to FIGS. 4, 5 and 6.

The housing lower portion 12, after the subassembly 20 has been installed, is covered with the housing upper portion 16 and welded thereto. The housing upper portion 16 in the present realization primarily has a protection and sealing function. In extreme cases, such as, for example, in the event of very powerful impacts, the housing upper portion 16 may prevent the subassembly 20 from falling out of the housing lower portion 12. Under normal conditions, the subassembly 20 does not touch the housing upper portion 16 and, owing to the gap which is thus produced, the housing upper portion 16 does not have a fixing or bracing function with respect to the subassembly 20.

Figure 2:
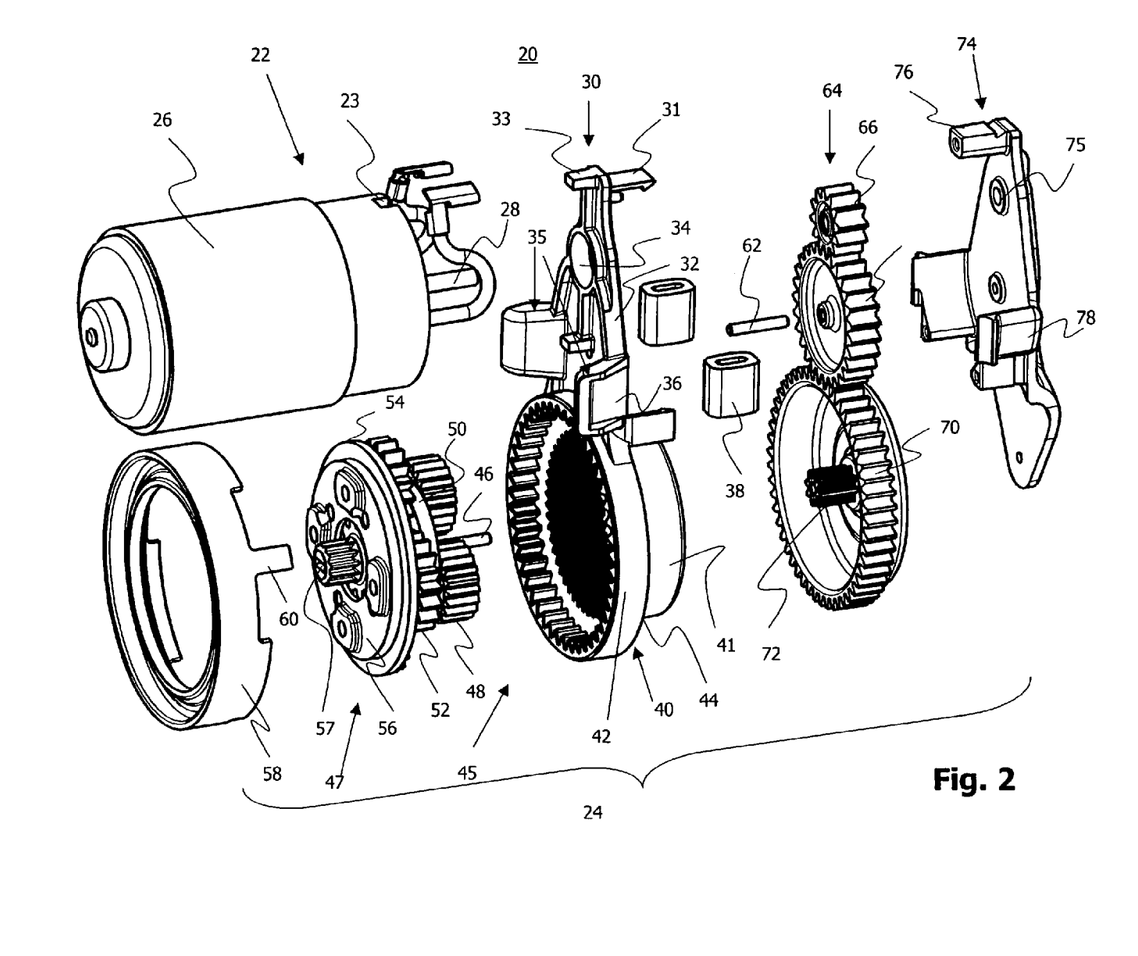
FIG. 2 is an exploded view of a subassembly of the assembly according to FIG. 1.
Figure 6:
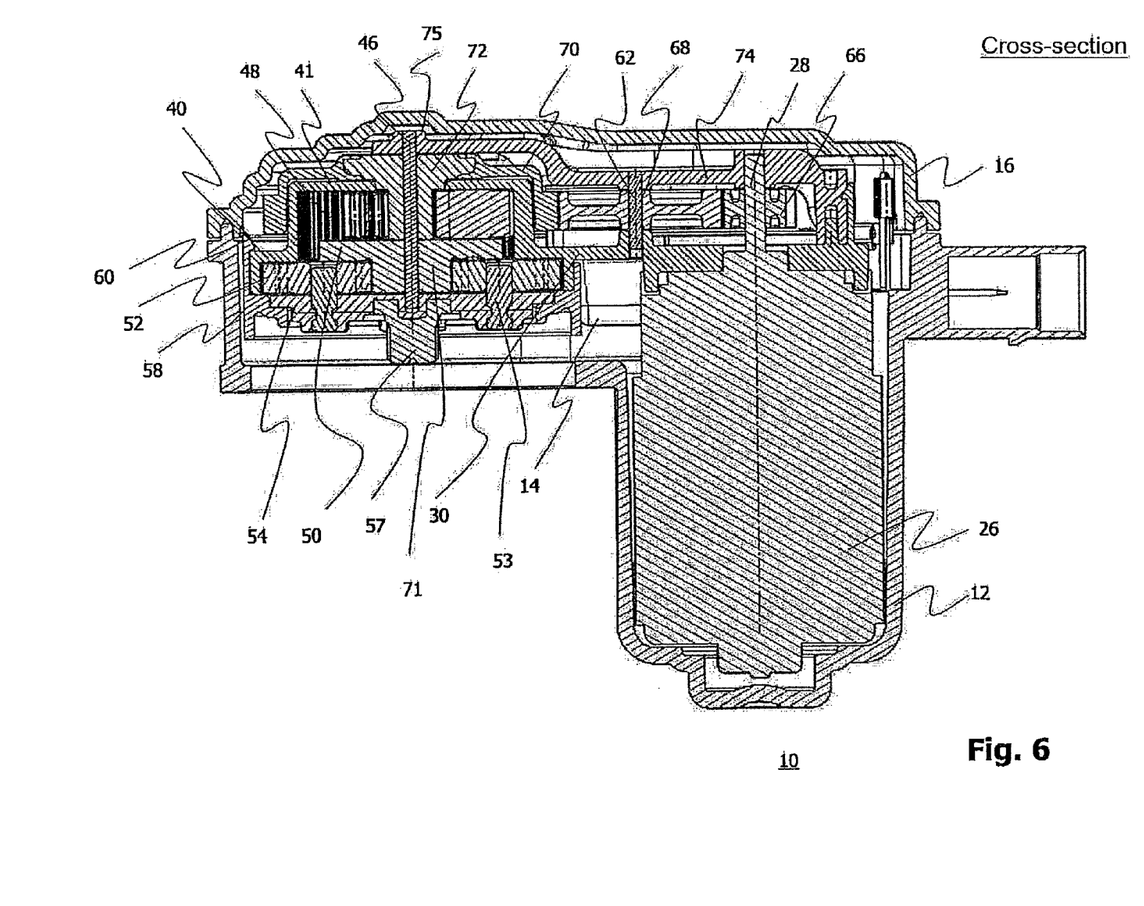
FIG. 6 is a third sectioned view of the assembly of the electromechanical brake actuator according to FIG. 1.

In the following the subassembly 20 is explained in greater detail with reference to FIGS. 2 and 6. FIG. 2 is an exploded view of the individual components of the subassembly 20. FIG. 6 is a cross-section of the assembly 10.

The subassembly 20 essentially comprises the drive device 22 which has an electric motor 26 and a drive shaft 28 and the gear device 24 whose first gear stage is in the form of a toothed wheel arrangement 64. A two-stage planet gear 45 adjoins the toothed wheel arrangement 64 as a second and third gear stage. Furthermore, the subassembly 20 comprises a fixing element 30, which comprises a portion of the first mounting device 35, a retention element 58 and a centering element 74 which each have, inter alia, a function with respect to the arrangement and/or securing of individual gear components.

In the present realization, the fixing element 30 is constructed as a carrier element. The carrier element 30 has central significance for the realization of the subassembly 20 and is therefore described in greater detail below.

The carrier element 30 comprises a plate-like base member 32 which has a triangle-like base face and at the first end of which a round opening 34 is recessed. At the lower side of the plate-like base member 32 there protrude perpendicularly two protrusions 33 which flank the opening 33 and which are arranged diametrically relative thereto. At the upper side of the base member 32, three mechanical plug type connectors 31 are provided (in FIG. 2, owing to the perspective illustration, only two mechanical plug type connectors are visible) which are each fittingly formed at the corner points of the triangle-like base member 32 perpendicularly relative to the upper side. In addition, the first mounting device 35 is fitted to the lateral faces of the base member 32.

At a second end of the carrier element 30 opposite the first end, a cylindrical internal-toothed wheel 40 is formed for the planet gear 45 which in the present realization forms a direct continuation of the base member 32. The cylindrical internal-toothed wheel 40 is configured for a two-stage planet gear 45 and therefore comprises two concentric, internally-toothed toothed wheel rings 41, 42 which are arranged one above the other and which each have a different tooth arrangement and a different ring diameter. A cover of the internal-toothed wheel 40 is constructed in a stepped manner in an axial direction in accordance with the different ring diameters of the two toothed wheel rings 41, 42, the lower (drive-side) toothed wheel ring 42 having a larger diameter. This graduation 44 is used, for example, for securing the retention element 58.

The plate-like base member 32 and the cylindrical internal-toothed wheel 40 are constructed integrally in the realization described. That is to say, the base member 32 and the internal-toothed wheel 40 together form the carrier element 30 on which both the drive device 22 and the components of the gear device 24 are arranged, centred, supported and/or secured.

Owing to this integration of the internal-toothed wheel 40 in the carrier element 30, the number of components for the subassembly 20 is reduced, whereby the weight of the brake actuator 10 is further lowered, the volume thereof reduced and the service-life thereof increased.

The carrier element 30 is constructed, for example, as a cast component, whereby a high level of precision for the production of the carrier element 30, in particular the internally toothed toothed wheel rings 41, 42, is achieved, with production costs which at the same time are manageable. Furthermore, the internal-toothed wheel 40 is thus integrated in the carrier element 30 in a particularly stable manner and consequently withstands the high mechanical loads (vibrations, impacts) to which it is subjected during operation. For the material selection, light metals or polymer materials are preferably used.

Using the carrier element 30, components of the gear device 24 and the electric motor 26 are combined to form an independent subassembly 20 of the assembly 10. To this end, the electric motor 26 is first mechanically secured to the drive shaft 28 at the lower side at the first end of the carrier element 30. To this end, there are provided at the upper side of the electric motor 26 two diametrically arranged recesses 23 by means of which the electric motor 26 is inserted so as to engage in the two projections 33 at the lower side of the carrier element 30. At the same time, the drive shaft 28 which transmits torque is guided through the opening 34 to the upper side of the carrier element 30.

At the upper side of the carrier element 30, the toothed wheel arrangement 64 is supported horizontally between the carrier element 30 and the fixing element 74. A first toothed wheel 66 is fitted on the drive shaft 28 in a torque-locking manner. The first toothed wheel 66 is in meshing engagement with a second toothed wheel 68, the second toothed wheel 68 being rotatably supported by a second gear shaft 62 and a hub provided on the upper side of the carrier element 30 (illustrated in FIG. 6, not visible in FIG. 2). The second toothed wheel 68 in turn meshes with a third toothed wheel 70. The third toothed wheel 70 is constructed as an externally toothed toothed wheel ring whose upper side is covered in a disc-like manner. Inside the third toothed wheel 70, a sun wheel 72 of a first stage of the planet gear 45 is arranged concentrically and in a torque-locking manner with respect to the third toothed wheel 70.

The diameter and the number of teeth of the three horizontally arranged toothed wheels 66, 68 and 70 increase in the listed sequence, respectively. The inner diameter of the third wheel 70 corresponds to the outer diameter of the cover of the toothed wheel ring 41. The third toothed wheel 70 is thereby supported in a close-fitting and rotatable manner on the upper side of the toothed wheel ring 41, the sun wheel 72 at the same time being inserted concentrically inside the toothed wheel ring 41 (can be seen in FIG. 6). The sun wheel 72 has a concentric inner opening through which a gear shaft 46 of the planet gear 45 can be guided.

In order to secure, support and/or centre the three toothed wheels 66, 68, 70 in a stable manner by means of the respective drive shaft or the gear shafts 28, 46, 62, a centering element 74 is fitted to the upper side of the carrier element 30 (illustrated in FIG. 6). The centering element 74 is constructed in a substantially plate-like manner and has at the lower side three bearings 75 which are spaced apart from each other. Furthermore, there are constructed at the lower side three mechanical plug type connectors 76 which have the same spatial arrangement as the three plug type connectors 31 of the carrier element 30 but which are constructed in a complementary manner in terms of their structure. The centering element 74 is connected so as to engage with the carrier element 30 via the respective plug type connectors, there being defined via the mechanical plug type connection between the upper side of the carrier element 30 and the lower side of the fixing element 74 a vertical spacing in which the toothed wheel arrangement 74 is accommodated in a protective manner. In addition, the drive shaft 28 and the two gear shafts 46, 62 are inserted at the respective upper end thereof on the bearing 75 of the fixing element 74 provided for this purpose in each case, whereby the toothed wheels 66, 68, 70 are securely positioned relative to each other both in a horizontal and in a vertical direction by means of the gear shafts thereof. Furthermore, the centering element 78 has in the embodiment described in this instance two laterally formed covering elements 78 whose construction and function in conjunction with the suspension of the subassembly 20 will be described in detail below.

The planet gear 45 is inserted in the lower side of the internal-toothed wheel 40. The two gear stages, which are arranged coaxially relative to each other, are first mounted externally. The planet gear 45 comprises two successive stages which correspond to the second and third gear stage of the gear device 24. The second gear stage comprises a disc-like planet wheel carrier 50, on which three planet wheels 48 which are identical in shape (in FIG. 2, only two planet wheels can be seen) are arranged coaxially and are rotatably supported by means of respective shafts (not visible). At the rear side of the planet wheel carrier 50 of the second gear stage, another sun wheel 51 (FIG. 6) is fitted concentrically and in a torque-locking manner, and is connected in a positive-locking manner to four identical planet wheels 52 (visible in FIG. 5; in FIGS. 2, 6 only two planet wheels are illustrated). The planet wheels 52 each rest by means of pin-like shafts 53 (FIG. 6) on a second plate-like planet wheel carrier 54 of the third gear stage. This is coupled at the lower side thereof in a torque-locking manner to a gear component 56 with an output-side journal 57 which is connected to a spindle gear in order to actuate a brake piston (not visible in FIGS. 2, 6).

In order to support the components of the two-stage planet gear 45, a first gear shaft 46 is provided. The first gear shaft 46 is arranged centrally on the plate-like planet wheel carrier 54 of the third gear stage and extends with its longitudinal axis along the axis of rotation of the planet wheel carrier 54. The first gear shaft 46 is preferably connected in a rotationally secure manner to the planet wheel carrier 54 of the third gear stage. It is possible for the first gear shaft 46 and the planet wheel carrier of the third gear stage 54 to be constructed as an integral component. In an alternative realization, the gear shaft may also be rotatably supported on the planet wheel carrier of the third gear stage 54.

The planet wheel carrier 54 of the third gear stage forms, together with the gear shaft 46 which protrudes perpendicularly, the core for supporting components of the two-stage planet gear. In ascending order, the sun wheel 71, the planet wheel carrier 50 of the second gear stage connected to the sun wheel 71 in a rotationally secure manner, the sun wheel 72 and the output-side toothed wheel 70 of the first gear stage connected thereto in a rotationally secure manner are rotatably supported by means of the first gear shaft 46 which is centrally fitted to the planet wheel carrier 54. The planet wheels 48 and 52 of the second and third gear stage themselves rest on the planet wheel carriers 50, 54, respectively. In that manner, a subassembly 47 of the gear device, that can be handled separately, can be constructed by the planet wheel carrier 54 and the first gear shaft 46 (FIG. 2).

Characteristic of the arrangement of the two-stage planet gear along the continuous first gear shaft 46 is that the sun wheel 71, 72 and the corresponding planet wheels 48, 52 are arranged with respect to the first gear shaft 46 for each of the two planet stages. In that manner, it is possible for the sun wheels and planet wheels to engage with each other in a close-fitting manner. Compensation for play between the toothed wheels owing to a different arrangement of the sun wheel 71, 72, on the one hand, and the planet wheels 48, 52, on the other hand, is not necessary, whereby the degree of efficiency and the service-life of the gear stage are substantially increased.

The subassembly 47 of the gear device constructed on the planet wheel carrier 54 and the first gear shaft 46 is introduced into the internal-toothed wheel 40 at the lower side, the continuous first gear shaft 46 being introduced at its first end into a bearing 75 provided therefor on the centering element 74. The gear shaft 46 which is provided for supporting the output-side gear component is thereby rotatably supported at the second end thereof on the planet wheel carrier of the third gear stage 54 and at the first end thereof on the centering element 74.

By the subassembly 47 being introduced into the internal-toothed wheel 40, the spatial position of the gear shaft 46 is uniquely determined by means of the planet wheels 48 and 52 which are guided in the internal-toothed wheel 40. In other words, the first gear shaft 46 becomes centred with respect to the internal-toothed wheel 40 by means of the planet wheels 48, 52 which are rotatably supported on the two planet wheel carriers 50, 54. The gear shaft 46 which is centred by means of the internal-toothed wheel 40 may be used as a reference point for positioning the gear shaft 62 and the drive shaft 28 on the fixing element 30 in accordance with tolerances.

The components of the planet gear 45 inserted into the internal-toothed wheel 40 or the subassembly 47 is/are prevented from falling out by means of the retention element 58. In the realization described, the retention element 58 is constructed in an annular manner with a securing element 60 which is formed axially on the outer side. The annular retention element 58 is constructed in such a manner that the second planet wheel carrier 54 and the gear component 56 are inserted and supported in the retention element 58 in a close-fitting manner. The retention element 58 is secured so as to engage at the graduation 44 of the internal-toothed wheel 40 by means of the securing element 60 at the outer side. In this manner, the gear device 24 is suspended completely on the carrier element 30 (visible in FIG. 6).

It will be understood that the arrangement of output-side gear components by means of a gear shaft 46 described herein is not limited to a two-stage planet gear. Instead, the first planet gear stage may be constructed similarly to the toothed wheel arrangement of the first gear stage as a toothed wheel gear or as a belt gear whose output-side toothed wheel is connected to the sun wheel 71 of the planet gear of the third gear stage in a rotationally secure manner and whose drive-side toothed wheel is connected to the output-side toothed wheel of the first gear stage in a torque-locking manner.

Figure 3:
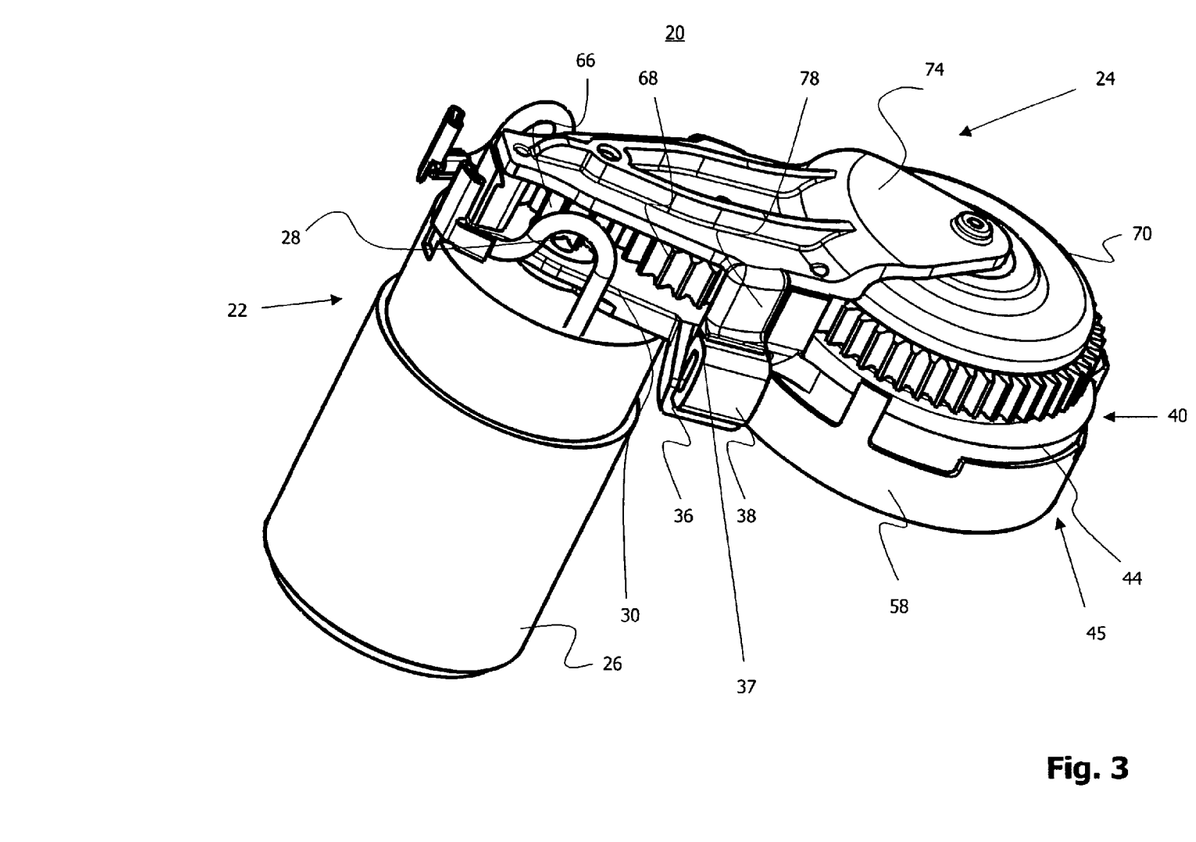
FIG. 3 is a perspective view of the mounted subassembly of the electromechanical brake actuator according to FIG. 2.

With reference to FIG. 3, the interaction of the components of the subassembly 20 described in FIG. 2 can be seen. The subassembly 20 is illustrated in FIG. 3 in the assembled state as a perspective view.

The electric motor 26 which is secured at the first end to the lower side of the carrier element 30 produces a torque which is required for the actuation of the electric parking brake. In order to produce the forces required to actuate the parking brake with appropriate sizing of the electric motor 26, the gear unit 24 is provided. This is connected at the output side to the spindle gear (not illustrated in FIG. 3) which converts the rotational movement into a translation movement and transmits it to the brake piston. This in turn then presses braking jaws of a wheel brake onto the respective brake disc.

The rotation movement of the drive shaft 28 is transmitted via the toothed wheel arrangement 74 to the sun wheel 72 (not visible) of the first stage of the planet gear 45. Owing to the increasing size of the successive toothed wheels 66, 68, 70, the rotational movement between the drive shaft 28 and the sun wheel 72 is reduced. The subsequent two-stage planet gear 45 forms the core of the gear device 24 which additionally reduces the rotational movement of the sun wheel 72 via the two gear stages. The planet gear 45 is fitted parallel with the drive device 22 to the second end of the carrier element 30. The internal-toothed wheel 40 which constitutes a component of the planet gear 45 is at the same time constructed as part of the carrier element 30 on which the planet stages are suspended via the retention element 58.

The upper side of the subassembly 20, in particular the toothed wheel arrangement 64, is positioned and covered by means of the centering element 74. In this manner, there is produced an inherently closed fully functional subassembly 20 which is introduced into the housing 11 in order to protect against the environment. In the present realization, the centering element 74 has another important function. It forms, by means of its two laterally formed covering elements 78, a portion of the first mounting device 35 by means of which the subassembly 20 is supported in the housing 11.

Figure 4:
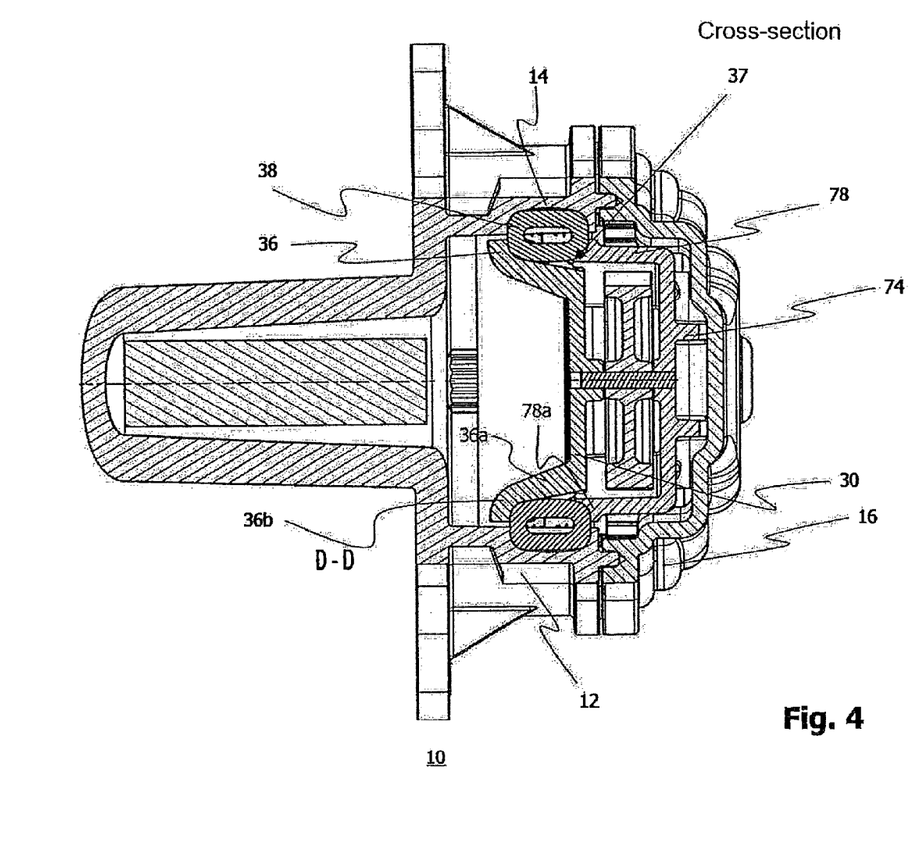
FIG. 4 is a first sectioned view of the assembly of the electromechanical brake actuator according to FIG. 1.

With reference to FIG. 2 and FIG. 4, the structure of the first mounting device 35 can be seen, which in the present realization comprises the two identical carriers 37 which are each constructed in two parts comprising the support element 36 and the covering element 78. FIG. 4 is a first sectioned view along a first direction of the subassembly 10 in accordance with the perspective illustration in FIG. 1.

The two support elements 36 have an identical structure. They are constructed in a blade-like manner and each comprise a slightly chamfered support face 36a in a vertical direction, another support face 36b in a horizontal direction and two limiting lateral faces (which can be seen in FIG. 2 but not in FIG. 4). The support face 36a is constructed as an arm-like lateral continuation of the carrier element 30 which extends vertically downwards with respect to the carrier element 30. The continuation is bent significantly outwards at the end thereof and merges into the horizontal support face 36b. The two support faces 36a and 36b are delimited at the sides thereof by one of the two lateral faces. In the present realization, the two support elements 36 are each constructed integrally with the carrier element 30. Alternatively, the two support elements 36 may be produced as a separate component and fixed to the carrier element.

The two covering elements 78 of the two carriers 37 are constructed on the centering element 74 and each have an identical construction. In a similar manner to the two support elements 36, the two covering elements 78 are each constructed as an arm-like lateral continuation of the centering element 74, the continuation extending downwards in a perpendicular direction with respect to the centering element 74 and having at the end a rounded portion which is concave and which is curved towards the outer side, whereby another narrow support face 78a is provided for the respective carrier 37. The covering elements 78 are each constructed integrally with the centering element 74. Alternatively, the two covering elements 78 may be produced as a separate component and be fixed to the centering element 74.

The spatial arrangement of the two covering elements 78 on the centering element 74 corresponds to the spatial arrangement of the support elements 36 on the carrier element 30. By joining together the centering element 74 and carrier element 30, the respective support element 36 is consequently covered by the corresponding covering element 78 at the upper side. In this manner, there is produced on both carriers 37 a lateral parallelepipedal receiving region which is open towards the outer side and which is provided to receive one of the damping elements 38 in each case.

The two carriers 37 are each fitted laterally to the opposing longitudinal sides of the subassembly 20 between the suspended electric motor 26 on the one hand and the internal-toothed wheel 40 on the other hand. The carriers 37 are arranged in such a manner that substantially no torque acts on a notional connection shaft which connects the two carriers 37 to each other. That is to say, the entire weight of the subassembly 20 rests in a manner distributed completely and uniformly on both carriers 37. The subassembly 20 can thereby be secured in the housing lower portion 12 in a self-supporting manner.

The simple construction of the second mounting device 13 is illustrated in FIG. 1. The second mounting device 13 comprises two identical, parallelepipedal recesses 14 which each have approximately the same height, width and depth dimensions as the two parallelepipedal receiving regions of the respective carriers 37. Furthermore, two recesses 14 are arranged so as to correspond to the spatial arrangement of the two carriers on the subassembly 20 at the two opposing longitudinal sides of the housing lower portion 12. Consequently, both mounting devices 13, 35 are substantially defined by parallelepipedal cavities which, when the subassembly 20 is mounted in the housing lower portion 12, are arranged in a mirror-like manner and which are each provided for receiving one of the damping elements 38.

Each damping element 38 is constructed from an elastomer plastics material having a defined spring and damping constant and is formed and sized in such a manner that it can be clamped laterally in each case in the cavities of the first and second mounting device 13, 35. Each damping element 38 is constructed as a hollow parallelepiped with rounded outer edges and with a specific wall thickness (cf. FIG. 2). Alternatively, parallelepipedal damping elements 38 may also be inserted into the cavity.

Figure 5:
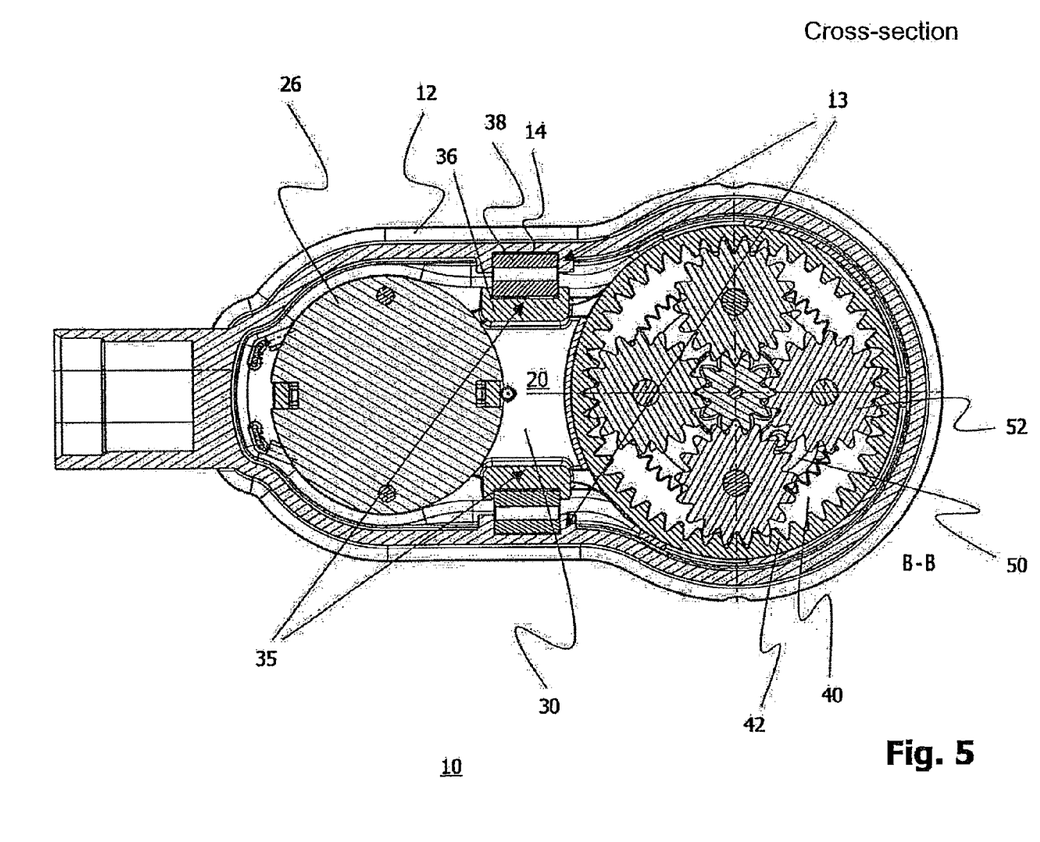
FIG. 5 is a second sectioned view (plan view) of the assembly of the electromechanical brake actuator according to FIG. 1.

FIGS. 4 and 5 illustrate the securing of the subassembly 20 in the housing lower portion 12 by means of the two mounting devices 13 and 35. FIG. 5 is a second sectioned view (plan view) of the receiving of the respective damping elements 38 by the assembly 10.

For the securing, the completely mounted subassembly 20 is first introduced into the housing lower portion 12, the two respective carriers 37 and the two respective recesses 14 facing each other in the housing lower portion 12. Subsequently, the two damping elements 38 are inserted between the two mounting devices 13 and 35. In order to be able to actually introduce the two damping elements 38 between the housing lower portion 12 and the subassembly 20, the two damping elements 38 are first inserted in a tilted manner along the slightly chamfered vertical support face 36a of the support element 36. The damping elements 38 are now inserted in each case at the lower side of the corresponding recess 14 at one side and into the support element 36 at the other side. At the upper side, the two damping elements 38 are now each clamped by the corresponding covering element 78, in which the centering plate 74 is securely connected to the carrier element 30. A vertical force is thereby applied to the upper side of the respective damping element 38 by means of the respective covering element 78. Owing to the concave support face 78a of the covering element 78, the damping element 38 is additionally laterally pressed into the recess 14. In this manner, the respective damping element 38 is pretensioned by the covering element 78a both in a vertical and in a horizontal direction and the subassembly 20 is thereby laterally pretensioned into the housing lower portion 12. In the installed state, the respective damping element 38 abuts the corresponding lateral faces of the two mounting devices 13, 35 in a flush manner (FIG. 4 and FIG. 5), whereby a high level of stability of the damping connection in the vertical and horizontal directions is ensured.

As an alternative to the above-described assembly of the subassembly 20 in the housing lower portion 12, the two damping elements 38 are first each suspended in a slightly tilted manner in the parallelepipedal regions of the first mounting device 35. Afterwards, the subassembly 20 with the two damping elements 38 which are each clamped at the side is inserted into the housing lower portion 12 and subsequently laterally clamped using the centering plate 74 and the two covering elements 78 to the two respective recesses 14 of the second mounting device 13.

Characteristic of the described clamping of the subassembly 20 in the housing lower portion 12 by means of the two damping elements 38 is that both the recess 14 on the housing lower portion 12 and the parallelepipedal opening on the carrier 37 each receive less than half of the respective damping element 38. This fact can clearly be seen in FIG. 4 and FIG. 5. Consequently, the two laterally fitted carriers 37 of the subassembly 20 do not touch the respective inner side of the housing lower portion 12. The subassembly 20 is consequently connected to the housing lower portion 12 in a damping manner only by means of the two damping elements 38. That is to say, the subassembly 20 is clamped on the housing by means of the two damping elements 38. In this manner, vibrations which may be produced by the drive device 22 and gear device 26 of the subassembly 20 are decoupled very effectively from the housing lower portion 12, whereby the noise development of the brake actuator is significantly damped. At the same time, vibrations or impacts acting on the housing 11 from the outer side are effectively shielded by the damping suspension which has an advantageous effect on the service-life of the gear unit 24 and the drive unit 22. Owing to the parallelepipedal configuration of the damping elements 38 together with the lateral clamping of the subassembly 20, vibrations and impacts from any directions (radial, lateral, axial direction and combinations thereof) are equally well damped.

Finally, FIG. 6 is a third sectioned view of the assembly 10 along a third axis. The sectioned view again clarifies that the subassembly 20 is supported in a damping manner only on the two recesses 14 in the housing lower portion 12.

In the present embodiment, both the gear device 24 and the drive device 22 are received in the housing 11 in a contact-free manner, whereby the housing 11 has only a protective function. Between the housing lower portion 12 and the gear device 24 or the drive device 22, a gap is thus produced. In other words, the housing 11 thus has no other centering or fixing functions. The mounting of the assembly 10 is thereby substantially simplified since, for example, slight deformations owing to the welding of the housing lower portion 12 to the housing upper portion 16 are not critical. Owing to the coupling to the spindle gear (not visible in FIG. 6) via the output-side journal 57, the subassembly necessarily has a third, gear-side support point.

Of course, the self-supporting suspension described in this instance can be modified as desired, for example, by additional (for example, three or four) carriers 37 being integrated in the subassembly or the carrier 37 being constructed in an annular or other manner. It is further self-evident that the damping elements 38 can be varied in any manner in terms of their shape and material selection or can be adapted to the corresponding configuration of the carrier. Furthermore, the concept described in this instance can also be used with electromechanically operated service brakes. Furthermore, other gear forms (for example, wobble plate mechanisms) may be used.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A subassembly for an electromechanical brake actuator, the subassembly being constructed so as to be received in a housing, comprising:
   a drive device which comprises an electric motor in order to generate a torque;
   a gear device for transmitting and delivering the torque to a brake device; and
   a fixing element which is constructed separately from the housing of the subassembly and which fixes the position of the gear device relative to the drive device, the fixing element being constructed integrally with an internal-toothed wheel of the gear device;
   wherein the fixing element is constructed as a carrier element which connects the drive device and the gear device to each other.

2. The subassembly for an electromechanical brake actuator according to claim 1, wherein the carrier element connects the drive device and the gear device in order to form a unit.

3. The subassembly for an electromechanical brake actuator according to claim 1, the drive device being arranged at a first end of the fixing element.

4. The subassembly for an electromechanical brake actuator according to claim 1, the internal-toothed wheel of the gear device being constructed at a second end of the fixing element.

5. The subassembly for an electromechanical brake actuator according to claim 1, wherein the fixing element has a plate-shaped base member.

6. The subassembly for an electromechanical brake actuator according to claim 1, wherein the fixing element has an opening for receiving the drive device.

7. The subassembly for an electromechanical brake actuator according to claim 1, wherein the fixing element is constructed with the internal-toothed wheel as a cast component.

8. The subassembly for an electromechanical brake actuator according to claim 1, wherein the internal-toothed wheel is part of a planet gear of the gear device, components of the planet gear being able to be introduced into the internal-toothed wheel.

9. The subassembly for an electromechanical brake actuator according to claim 8, the internal-toothed wheel comprising at least one internally toothed wheel ring, at least one torque-transmitting planet wheel carrier of the gear device having a plurality of planet wheels thereon being able to be introduced into the internal-toothed wheel.

10. The subassembly for an electromechanical brake actuator according to claim 9, wherein the at least one planet wheel carrier can be fixed to the internal-toothed wheel by means of a retention element.

11. The subassembly for an electromechanical brake actuator according to claim 8, wherein the torque transmission from the drive device to a sun wheel of the planet gear is brought about by a toothed wheel arrangement.

12. The subassembly for an electromechanical brake actuator according to claim 11, wherein the toothed wheel arrangement is supported on the fixing element.

13. The subassembly for an electromechanical brake actuator according to claim 12, wherein a centering element is fitted to the fixing element.

14. The subassembly for an electromechanical brake actuator according to claim 13, wherein the centering element secures the toothed wheel arrangement at the upper side.

15. A subassembly for an electromechanical brake actuator comprising:
   a drive device which comprises an electric motor in order to generate a torque; and
   a gear device which successively comprises a first, a second and a third gear stage for transmitting the torque, the third gear stage being constructed as a planet gear, and an output-side gear element of the second gear stage and a sun wheel of the planet gear being fitted to a planet wheel carrier of the third gear stage via a first gear shaft, which sun wheel is arranged in a torque-locking and concentric manner with respect to the gear element, the first gear shaft being received at the first end thereof on a centering element and/or at the second end thereof on the planet wheel carrier of the third gear stage, the centering element constructed separately from a housing of the subassembly, wherein the housing covers at least a section of the centering element receiving the first gear shaft.

16. The subassembly for an electromechanical brake actuator according to claim 15, the first gear shaft being connected to the planet wheel carrier of the third gear stage in a rotationally secure manner.

17. The subassembly for an electromechanical brake actuator according to claim 15, the centering element comprising a bearing for receiving the first gear shaft.

18. The subassembly for an electromechanical brake actuator according to claim 15, the centering element and a fixing element for fixing the drive device being constructed and arranged relative to each other in such a manner that they form a cage structure for receiving gear components.

19. The subassembly for an electromechanical brake actuator according to claim 18, an internal-toothed wheel of the gear device being constructed integrally with the fixing element.

20. The subassembly for an electromechanical brake actuator according to claim 15, the first gear shaft being arranged centrally on the planet wheel carrier of the third gear stage.

21. The subassembly for an electromechanical brake actuator according to claim 15, bearing shafts for receiving planet wheels further being provided on the planet wheel carrier of the third gear stage.

22. The subassembly for an electromechanical brake actuator according to claim 15, the first gear shaft being rotatably supported at its first end on the centering element.

23. The subassembly for an electromechanical brake actuator according to claim 15, the second gear stage being constructed as a planet gear and the output-side gear element of the second gear stage being constructed as a planet wheel carrier.

24. The subassembly for an electromechanical brake actuator according to claim 23, the first gear shaft further receiving in a supporting manner a sun wheel of the second gear stage and an output-side gear element of the first gear stage connected to the sun wheel in a torque-locking manner.

25. The subassembly for an electromechanical brake actuator according to claim 23, the two planet gear stages being arranged one after the other along the first gear shaft.

26. The subassembly for an electromechanical brake actuator according to claim 15, further comprising a second gear shaft for receiving gear components of the first gear stage, the second gear shaft being received at a first end in the centering element and at a second end in a fixing element.

27. The subassembly for an electromechanical brake actuator according to claim 26, the second gear shaft being rotatably supported at a first end on the centering element and at a second end on the fixing element, respectively.

28. The subassembly for an electromechanical brake actuator according to claim 15, the planet wheel carrier and the first gear shaft being constructed integrally.

* * * * *